July 10, 1951     J. R. NYL     2,560,525
ANCHOR STUD
Filed Sept. 28, 1946
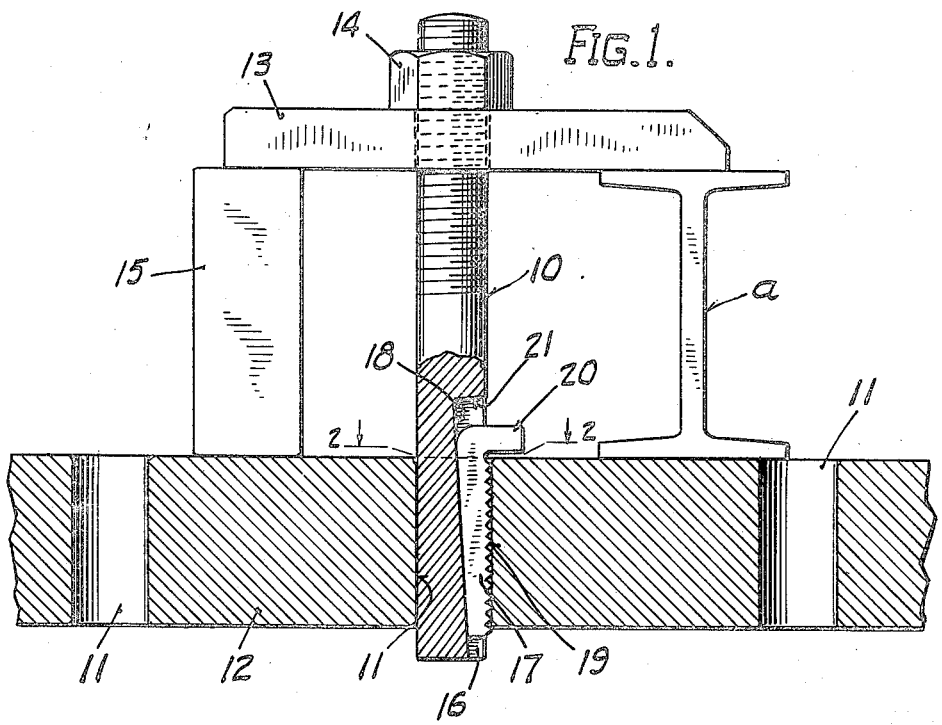
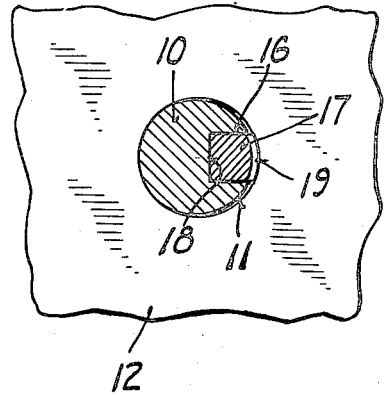
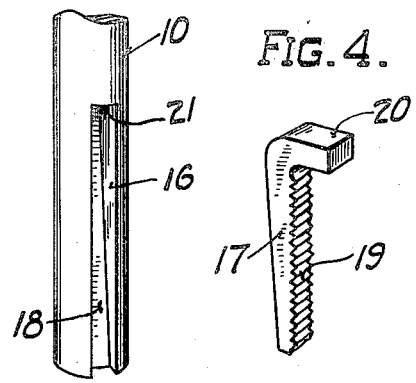
John R. Nyl
INVENTOR.
BY *Ralph W. Brown*
ATTORNEY.

Patented July 10, 1951

2,560,525

UNITED STATES PATENT OFFICE 2,560,525

ANCHOR STUD

John R. Nyl, Milwaukee, Wis., assignor to The Falk Corporation, Milwaukee, Wis., a corporation of Wisconsin Application September 28, 1946, Serial No. 700,007

1 Claim. (Cl. 287—20)

This invention relates to anchor studs for work holders and the like.

Such studs are commonly used with "lay-out," "set-up" and other work supporting tables as a means for providing secure anchorage for various types of work clamps thereon. They are ordinarily releasably secured to the table so as to permit transfer to any of various positions thereon in order to accommodate work pieces of various sizes and shapes.

One object of the present invention is to provide an improved stud so designed as to insure secure anchorage thereof in a table and at the same time to permit quick and ready release and consequent transfer thereof to other positions best suited for the work at hand.

Other more specific objects and advantages will appear, expressed or implied, from the following description of an illustrative embodiment of this invention.

In the accompanying drawings:

Figure 1 is a sectional view of a work supporting table equipped with a clamp sustaining stud constructed in accordance with the present invention.

Fig. 2 is a horizontal sectional view taken substantially along the line 2—2 of Fig. 1.

Figs. 3 and 4 are perspective views of the lower portion of the stud and of the coacting locking wedge, respectively, shown in the other views.

The stud selected for illustration is shown at 10 releasably anchored in one of a number of circular openings 11 provided in a work supporting table 12 in a manner to provide anchorage for a typical clamp bar 13.

In this instance the stud 10 extends through the bar 13 and is threaded at its upper end to receive a nut 14 which reacts to develop a holding pressure between one end of the bar and a typical work piece a. The bar 13 is shown resting at its other end upon a suitable fulcrum member such as a block 15.

Provision is made for securely locking the stud 10 in the table 12 in such manner as to permit a quick and ready release and transfer thereof from one table opening to another. For this purpose a longitudinal groove 16 is formed in the lower end of the stud 10 adapted to receive a locking wedge 17. The base 18 of the groove slopes downward and outward and the wedge 17 is similarly tapered so that, when seated in the groove, the exposed face 19 of the wedge, which is preferably transversely curved, extends substantially parallel to the longitudinal axis of the stud 10 so as to bear against the inner wall of the opening 11 substantially throughout its depth. The face 19 of the wedge is also preferably toothed, serrated or otherwise roughened to increase the grip thereof against the wall of the opening 11.

The wedge shown is also preferably equipped with a laterally projecting head 20 at its upper thicker end by which it may be driven into wedging position within the opening 11.

From the foregoing it will of course be understood that after the lower end of the stud 10 has been lowered into a selected table opening 11, with the wedge 17 disposed in the upper end of the groove 16, the stud is securely locked in place by driving or otherwise forcing the wedge downward into gripping engagement with the interior wall of the opening. When thus positioned and locked, the stud 10 then constitutes a secure anchorage for the bar 13 or other type of clamp which may be applied to the work piece in any known or approved manner.

It will be noted that the tension in the stud 10 induced by the clamping pressure of the bar 13 against the work a causes a reaction against the wedge 17 in such direction as to increase the grip of the latter against the inner wall of the opening 11. A sure and secure anchorage is thus insured.

It will be further noted that release of the stud 10 from the table opening 11 may be quickly and readily effected, after the clamping pressure has been released by loosening the nut 14, merely by lightly tapping the top of the stud to thereby relieve the gripping action of the wedge 17, whereupon the stud 10 and wedge 17 are free to be lifted as a unit clear of the table 12. It will be further noted that, when thus released, the stud 10 will not drop through the table 12, because the head 20 of the wedge coacts with the top of the table and with the upper end wall 21 of the groove 16 to limit the drop of the stud.

Various changes may be made in the embodiment of the invention hereinabove specifically described without departing from or sacrificing the advantages of the invention as defined in the appended claim.

I claim:

An anchor stud for work clamps and the like, said stud having an end for entry into a support, and having a longitudinal slot of limited length formed in said end, a wedge seated in said slot, said slot and wedge having opposed inclined faces coacting to securely lock said stud and wedge in said support in response to lengthwise movement of said stud in one direction and to release the same upon lengthwise movement of said stud in an opposite direction, and a laterally projecting driving lug on said wedge coacting with said support and with the inner end of said slot to limit lengthwise movement of said stud in the direction last named.

JOHN R. NYL.

REFERENCES CITED

The following references are of record in the file of this patent:

UNITED STATES PATENTS

| Number | Name | Date |
| --- | --- | --- |
| 798,440 | McNutty | Aug. 29, 1905 |
| 922,980 | Vernon | May 25, 1909 |
| 1,072,363 | Roberts | Sept. 2, 1913 |
| 1,110,797 | Knox | Sept. 15, 1914 |
| 1,227,391 | Cooper | May 22, 1917 |